Sept. 13, 1938.　　　E. W. MILLER　　　2,129,858
GEAR GENERATING MACHINE
Filed July 3, 1934　　　5 Sheets-Sheet 1

Fig. 1.

Inventor
Edward W. Miller

Patented Sept. 13, 1938

2,129,858

UNITED STATES PATENT OFFICE 2,129,858

GEAR GENERATING MACHINE

Edward W. Miller, Springfield, Vt., assignor to The Fellows Gear Shaper Company, Springfield, Vt., a corporation of Vermont Application July 3, 1934, Serial No. 733,592

39 Claims. (Cl. 90—9)

The object of this invention is to effect improvements in gear cutting machines of the type which generate gear tooth curves by the conjoint relative reciprocation and rotation of the work piece and a gear shaper cutter, i. e., a cutter having teeth arranged like the teeth of a gear, with cutting edges at one end; the relative reciprocation being effected in the direction of the cutter axis. Such improvements comprise means for effecting a rapid approach and recession between the cutter and work piece for speed in changing the work (mounting blanks and removing completed gears); means for readily transforming the machine from condition to cut external gears to the condition for cutting internal gears, and vice versa; means for establishing or changing the direction in which the cutter is backed off to clear the work on non cutting or return strokes, and other improvements related to the foregoing.

The nature and particulars of the invention involved herein are described in the following specification and more particularly pointed out in the claims; it being understood that I intend to protect not only the specific machine here illustrated, but also other machines, however dissimilar superficially from this one, which embody any or all of the novel principles thereof, and equivalents of the specific illustration.

In the drawings—

Like reference characters designate the same parts wherever they occur in all the figures.

In so far as concerns the general principles of rotating the cutter and work piece in harmony, effecting relative cutting reciprocation between them in the direction of the cutter axis, and giving a helical motion to the cutter, or work piece, when helical gears are cut, this machine is essentially like standard types of the Fellows gear shaping machine. Thus it is provided with a rotatable and reciprocative cutter spindle 1 to the protruding end of which is secured a gear shaper cutter 2, and with a rotatable work spindle 3 to the upper end of which the gear blank or work piece 4 to be finished is secured by suitable means. The cutter spindle is reciprocated by a gear segment 5 mounted to rock about a pivot stud 7 and meshing with encircling rack teeth 6 on the spindle, said segment being connected with an arm 8 which is oscillated by a motor 10, belt or chain 11, pulley or sprocket 12, shaft 13, crank 14 mounted on said shaft, and connecting rod or link 15. The cutter spindle is rotated by a worm 16, worm wheel 17, and complemental guides 18 and 19, the contact faces of which are helicoids coaxial with the axis of the spindle when the machine is set up for cutting helical gears, and parallel or coincident with such axis for cutting straight toothed gears. The work spindle is rotated by a worm 20 and gear 21.

Figure 1:
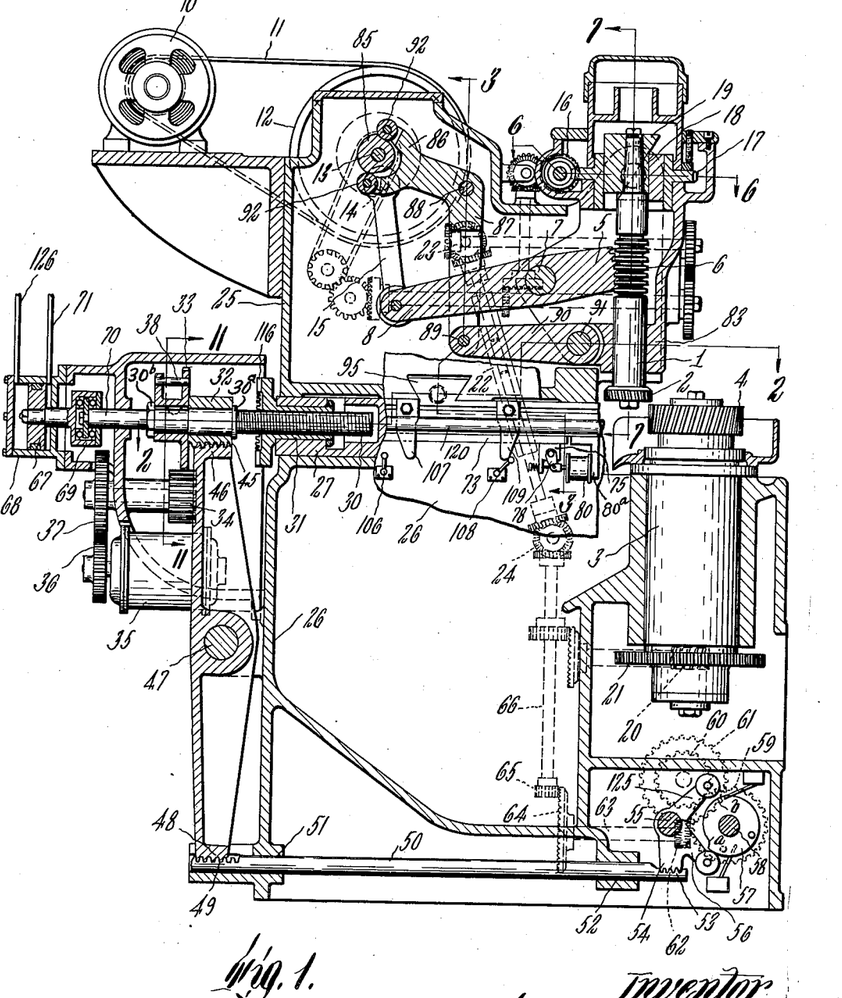
Fig. 1 is a vertical section of the illustrative machine referred to, taken on a plane which includes the axes of the cutter and work.

Suitable mechanism is provided for driving these worms at the correct speed ratio; a suitable train of gears and shafting, driven from shaft 13, being shown in a diagrammatic manner by broken lines in Fig. 1. This showing needs no description, inasmuch as the mechanism referred to involves nothing novel with the present invention; except to note that it includes a telescopic shaft 22, in swiveled geared connection at 23 and 24 with shafts mounted respectively in the movable bed 25 which carries the cutter spindle, and the stationary base in which the work spindle is mounted, whereby it accommodates itself automatically to horizontal movement of the bed 25 in the plane of Fig. 1.

The new features of the invention comprise in substance the following:

*Means for advancing and retracting the cutter with respect to the work.*—The bed or carriage 25 which carries the cutter spindle is supported on a slide 27 which in turn rests on the base 26 and is guided by a rib 28 and a flanking guideway. A screw 30 is threaded into a nut 31 which is seated rotatably in this slide, but is normally withheld from rotation. The screw is contained rotatably in a bearing 32 and carries rigidly fixed to it a gear 33 meshing with a gear 34 which is driven from an electric motor 35 through gears 36 and 37. The motor here used is preferably of the type known as a torque motor; i. e., one which will exert a constant torque of substantial amount when supplied with current while blocked so that its armature cannot rotate, and so constructed that it may be thus supplied with current for indefinite periods without injury. To distinguish this motor from the main or driving motor 10, first described, it may be called the shift motor. When the gear 33 is unobstructed, the shift motor rotates it, thereby rotating the screw 30 and advancing or retracting the bed 25, according to its direction of rotation. Said gear carries a stud or equivalent stop element 38 which, when the gear is rotated in the direction of the arrow shown in Fig. 11 and a stop lever 39 is placed in its path, arrests rotation of these parts. Stop lever 39 is pivoted on a stationary pivot 40 and is connected at 41 with a rod or plunger 42 upon which a spring 43 acts in a direction tending to raise stop lever 39 out of the path of stud 38. Plunger 42 is acted on by a solenoid 44 which, when energized, overcomes spring 43 and shifts stop lever 39 from its normally inoperative location to the obstructing position shown in Fig. 11.

The bearing 32 constitutes an abutment taking the thrust reaction of screw 30, being confined in end engagement with gear 33, between a shoulder 30a and a nut 30b on the screw is movable in the same direction as the slide 27, and may be slidingly engaged with suitable guides if desired; although such guides are not essential and are not shown here. It is provided with rack teeth 45 in mesh with conjugate gear teeth on arm 46 of a lever which is pivoted on a stud 47 mounted on the machine base. Said lever has a second arm 48 provided with gear teeth which mesh with a rack 49 carried by a longitudinally movable bar 50 slidingly mounted in guides 51 and 52. This bar carries a second rack 53 meshing with gear teeth on the arm 54 of a bell crank lever pivoted at 55 to the base. A second arm 56 of said bell crank lever carries a roll bearing on a depth feed cam 57 on a shaft 58 which is driven continuously by gearing 59, 60, 61, 62, shaft 63 and gears 64, 65 from the shaft 66 which transmits rotation to the work spindle driving worm; as shown by dotted lines in Fig. 1.

A piston 67 in a pneumatic or hydraulic cylinder 68 is connected by a coupling 69 with an extension 70 of the screw 30. Fluid under pressure, delivered by a pipe 71 to the space in the cylinder at the right of piston 67, exerts force tending to withdraw the bed carrying slide 27 to the left from the position shown in Fig. 1, and pressing the arm 56 toward the depth feed cam 57. Such pressure is great enough to retract the bed when permitted by the depth feed cam, and also to sustain the reaction of the screw 30 when the latter is operated to withdraw the slide further.

The depth feed cam controls the gradual advance of the cutter to the required depth into the work during the cutting operation, by the gradual rise of its surface from the point *a* to point *b*, and holds the cutter at such depth by a dwell forming substantially the balance of its circumference, which travels past the contact point of lever arm 56 in such time as is required for the work to make at least a complete revolution. And the rotation of screw 30, independently effected by the shift motor 35, suffices to withdraw the cutter carriage or bed rapidly until the cutter and overhanging parts of the bed are clear of the work, and returns the cutter to its position for commencement of depth feed. This facilitates placement of gear blanks on the work spindle and removal of finished work pieces, and enables the work to be changed in a minimum time, without muscular labor on the part of the machine attendant in shifting the massive bed and parts carried thereby.

Electrical controls are provided for starting and stopping the main motor 10 and shift motor 35, and reversing the direction of the latter, which will be later described in a comprehensive description of the electrical equipment.

Figure 3:
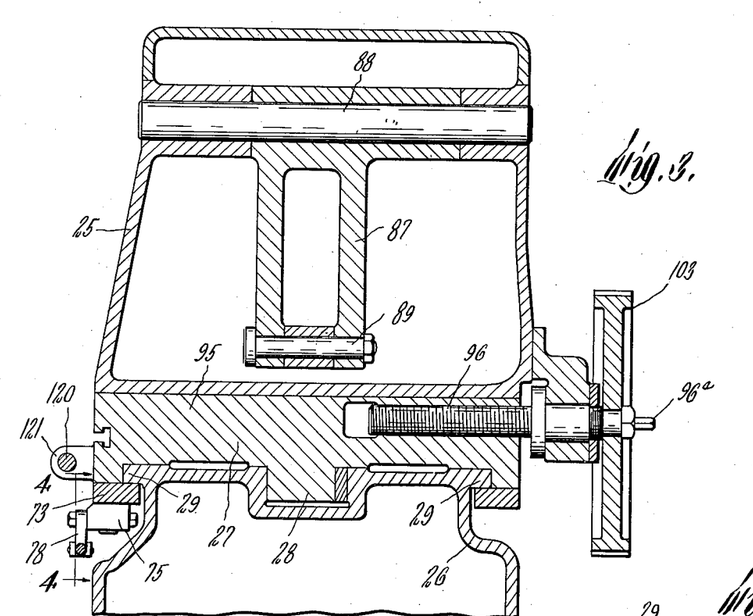
Fig. 3 is a cross section taken on line 3—3 of Fig. 2.
Figure 4:
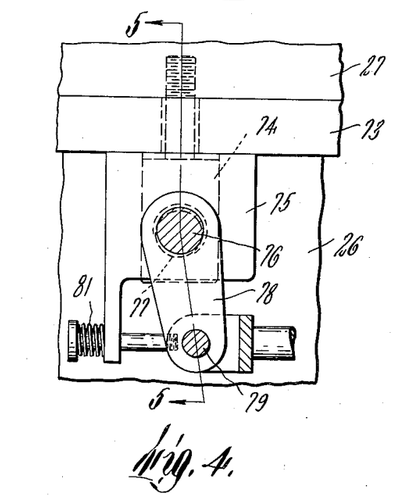
Fig. 4 is a detail elevation and partial section of the clamp means by which the shiftable bed carrying the cutter spindle is made fast. This view represents the part shown at the right of line 4—4 of Fig. 3, drawn on a larger scale.
Figure 5:
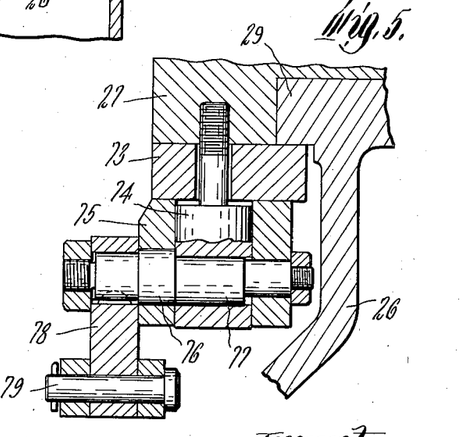
Fig. 5 is a cross section taken on line 5—5 of Fig. 4.

*Rigid clamping of the bed.*—The bed 25 is clamped to the base at the conclusion of the depth feed of the cutter, and maintained in clamped condition until the work piece is completed. In this illustration the clamping action is accomplished by forcing the gib 73 which underlies one of the supporting flanges 29 of the base (Fig. 3) tightly up against the under side of this flange. A stud 74 passes through this gib from beneath into rigid connection with the slide 27. This stud is embraced by a block 75 bearing on the under side of the gib and containing rotatably a shaft or pin 76 which has an eccentric section 77 passing through a hole in the stud. The end of shaft 76 protrudes from the block and is keyed to an arm 78 coupled by a pin 79 with the core of a solenoid 80 (Fig. 1). This solenoid is carried by the slide 27, being supported by a bracket 80a secured to the under side of the slide; and when it is energized it turns shaft 76 so as to react downwardly on stud 74 and, by lifting block 75, force the gib tightly against the flange 29. This clamping means is located near the end of the gib adjacent to the cutter, and is of value particularly in the performance of heavy roughing work where the resistance to the thrust of the cutter may be enough to lift the bed otherwise. It increases the rigidity of the machine and eliminates one possible source of looseness and inaccuracy. Activation of the solenoid is controlled by the depth feed cam through means later described. When deenergized, a spring 81 (Fig. 4) connected to the arm 78 through the coupling relieves the clamping thrust.

*Cutter relieving means.*—The cutter spindle 1 has its bearings in a saddle 83 which is swiveled to the bed 25 by trunnions 84 (Figs. 6 and 7) alined on an axis perpendicular to the spindle axis, and perpendicular also, or nearly so, to the direction in which the bed is moved in advancing the cutter toward and withdrawing it from the work. The trunnion axis is located at a considerable distance from the cutter in order that the linear movement of the cutter sufficient to clear its teeth from the work on non cutting strokes may be accomplished with a very small angular movement about this axis; and it intersects the spindle axis. The spindle rotating worm 16 and worm gear, and the pivot stud 7 for the spindle reciprocating segment, are all carried by the saddle, whereby they remain in the same positions relatively to one another at all times.

Figures 2, 2A:
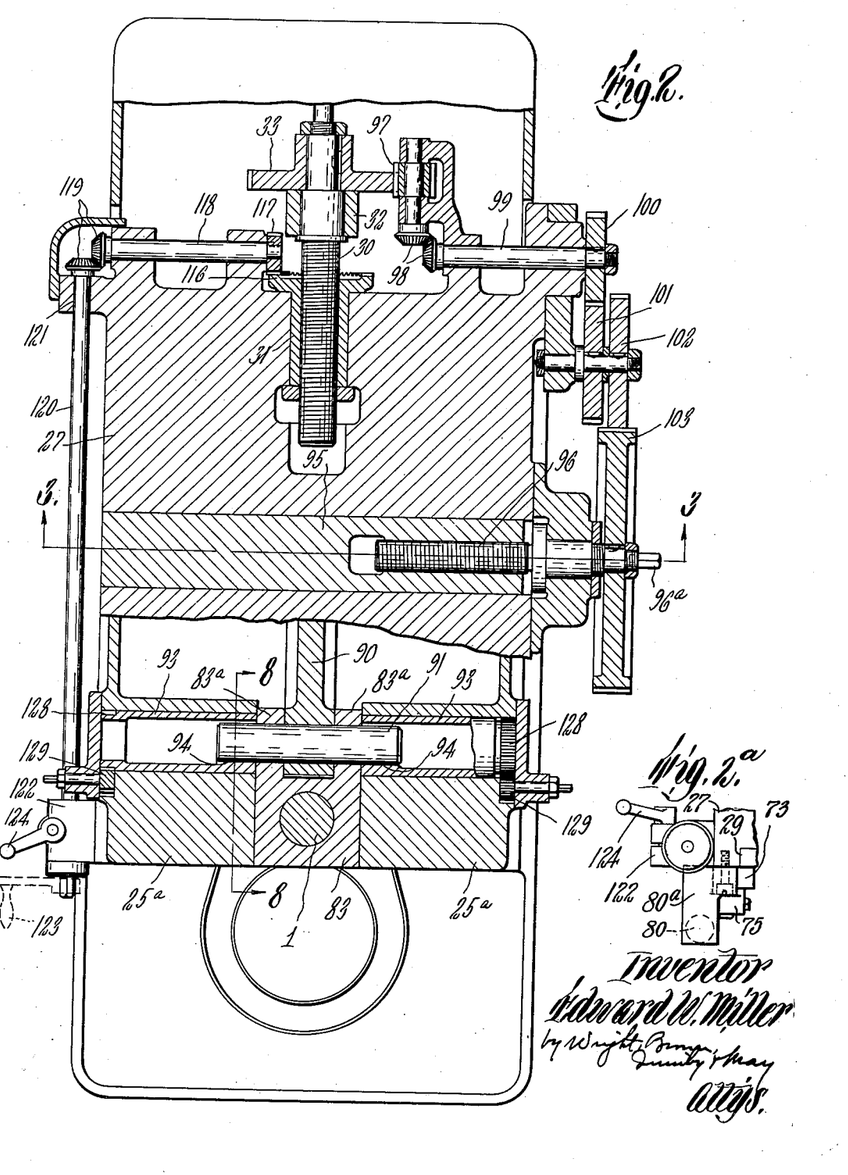
Fig. 2 is a horizontal section taken on line 2—2 of Fig. 1.
Fig. 2a is a fragmentary front elevation of the left hand portion of the slide.

A cam 85 on shaft 13 is embraced by a fork 86 on one arm of a bell crank lever 87, pivoted to the bed at 88. The other arm of this lever is connected by a pin 89 with a link 90 which in turn is coupled to the saddle by a massive pin 91. The branches of the forked arm 86 carry anti-friction rolls 92 which engage cam 85 at opposite sides of the shaft 13, whereby the cam acts positively to move the saddle in opposite directions. Pin 91 is not only a coupling pivot, but it is also a stop bar which acts in conjunction with an abutment to establish the position of the cutter rigidly during its cutting strokes. It is driven tightly into the parts 83a of the saddle (Fig. 2) which flank the extremity of link 90, and its ends protrude into the contiguous ends of two bushings 93 which are seated in the parts 25a of the bed at either side of the saddle. Each of these bushings has an internal seat 94 at one side which fits the adjacent extremity of the stop bar, but otherwise the interior of the bushing is enough larger than the seat or stop bar to permit withdrawal of the latter from the stop bearing as far as necessary for clearance of the cutter on return strokes. This is made plain by Figs. 8 and 9, the former of which shows the stop bar in firm engagement with the seat as the cutter commences its cutting (downward) stroke, and the latter shows the bar withdrawn from the seat after the completion of the cutting stroke and when the cutter is about to return. It is to be understood of course that the construction and position of the cam 85 are suitably designed to give these movements to the saddle in proper timing with the reciprocations of the cutter spindle. It will also be apparent to those skilled in the art, without necessity of detailed explanation, that adjusting means may be provided to cause the cam to press the stop bar against its seats with the desired force and without at the same time causing excessive pressure between the various pivots and bearings included in this linkage, and to compensate for wearing. It will be understood also that as the stop bar is tightly fitted in the saddle, it has a rotative fit in the link 90.

The direction of backing off or relief movement of the cutter, which is definitely established with respect to the bed (being in a plane perpendicular to the axis of trunnions 84) should be somewhat oblique to the common plane (or line of centers) of the cutter and work spindle axes in order to clear the cutter teeth of overlapping parts of the work piece at the side of the line of centers where the teeth have not yet been completed in the blank. The proper obliquity is in the neighborhood of 7°, but varies with the ratio between the diameters of cutter and work piece, and the pitch and pressure angle of the cutter. I have provided here a means for adjusting and regulating this obliquity to fit all conditions, as follows:

The bed 25 is slidably movable transversely on the slide 27, being guided by a rib 95 (Fig. 1) on the slide, and carries a screw 96 (Fig. 2) which fits a threaded hole in the rib. This screw may be turned by a wrench applied to its outer end 96a, so as to set off the center of the cutter (designated at c in Fig. 12) to one side or the other of the line d—e which passes through the center d of the work spindle perpendicular to the axis f—g of the saddle trunnions 84. Thereby when the cutter is moved in the plane c—h, perpendicular to the trunnion axis, its movement is oblique to the line of centers c—d; and the obliquity may be made of any degree and to either side of the line of centers, by appropriate setting of the screw.

It may be desirable also, to move the cutter spindle obliquely to the travel of the bed in withdrawing and approaching the work; and to accomplish this, I have provided a train of gearing between the withdrawing screw 30 and the transverse screw 96, consisting of gear 33, pinion 97, miter gears 98, shaft 99, and a gear train 100, 101, 102 and 103, of which any or all of the members may be change gears for changing the speed ratio. However, the automatic geared connection is optional and may be omitted. In any event, the screw 96 is susceptible of manual adjustment as described.

Figures 11, 12, 13:
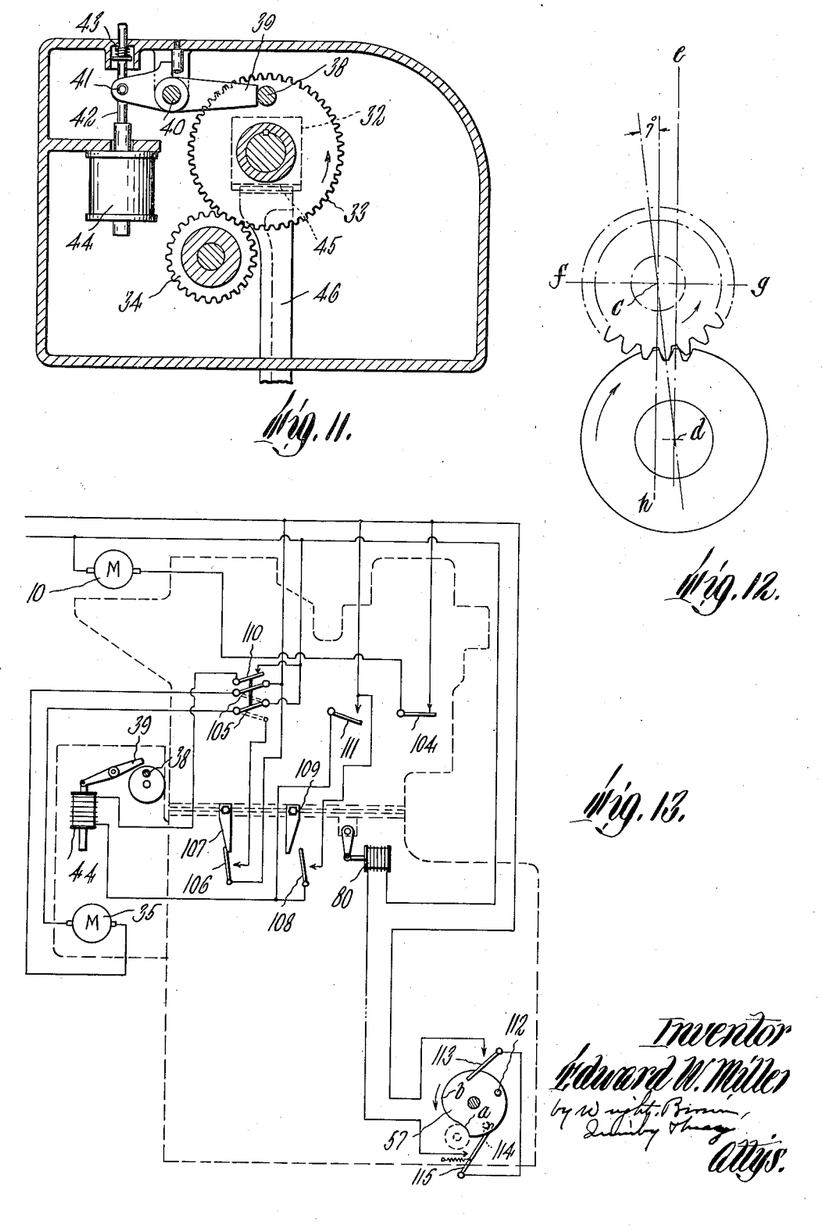
Fig. 11 is a vertical detail section taken on line 11—11 of Fig. 1.
Fig. 12 is a diagram illustrating the preferred relationship of the direction in which the cutter is backed off, to the line of centers of the cutter and work.
Fig. 13 is an illustrative diagram of electrical equipment for driving, and controlling the motion of, the moving parts of the machine.

*Operating controls and adjustments.*—The motive power for the machine here shown is electrical, and is controlled in part manually and in part automatically. The main motor 10 is started and stopped by a switch shown diagrammatically at 104 in Fig. 13, which may be closed and opened by push buttons. The shift motor 35 is controlled by a reversing switch 105, which also may be controlled by push buttons designated, for instance, as "forward" and "reverse" respectively. It is shown in Fig. 13 as being in the "forward" driving position. A limit switch 106 in the reverse circuit of the shift motor is controlled by an adjustable finger or trip device 107 carried by the slide 27, so as to stop the motor when the cutter has been withdrawn the desired distance from the work.

Solenoid 44 is automatically energized by a limit switch 108 controlled by a trip device or finger 109 also adjustably carried by the slide. The adjustment of the latter finger is such as to cause the solenoid to become active when the cutter has nearly reached the working position, but is yet far enough short of that position to allow for the partial rotation of the screw occurring before the stop pin 38 engages the stop lever 39. This action occurs without interruption of the shift motor circuit, whereby that motor continues to hold the abutment elements 38 and 39 firmly in contact with one another, precluding subsequent change in the transmission mechanism between the cutter and its depth feed cam, until the shift motor is reversed.

Reversal of the shift motor control switch opens the solenoid circuit, as by means of a break switch 110 shown as connected to the reversing switch, whereupon the stop lever 39 is moved by its spring clear of stop pin 38. There is also a manual push button switch 111 in a shunt circuit to the solenoid 44, for operation to stop the movement of the cutter carrying bed at the will of the operator.

The bed clamping solenoid 80 is controlled by the depth feed cam 57 through a pin 112 on the latter which closes a previously open switch 113 to energize the solenoid when the cutter has been fed to depth; and a second pin 114 which opens a normally and automatically closed switch 115 in series connection with switch 113 to de-energize the solenoid at the completion of the cutting operation.

It will be understood that both trip fingers 107 and 109 are adjustable back and forth in the line of travel of the slide 27.

The stop lever 39 can arrest the pin 38 at only one point in the rotation of the lead screw, wherefore possible stopping positions of the cutter effected by this means are separated from one another by the pitch of the screw. A more exact adjustment of the position occupied by the cutter for commencement of feed by the depth feed cam is effected by the nut 31. As previously mentioned, this nut is rotatable in the slide 27. It carries a gear 116 on its outer end which meshes with a pinion 117 on a transverse shaft 118 and this shaft is connected by gears 119 with a shaft 120 rotatable in bearings 121 and 122 on the slide 27. A crank or wrench 123, shown by dotted lines in Fig. 2, serves to rotate this shaft and the nut. The bearing 122 is divided and is equipped with a clamping device 124 of known character, whereby the shaft may be gripped to prevent accidental rotation of the nut.

Figures 6, 7, 8, 9, 10:
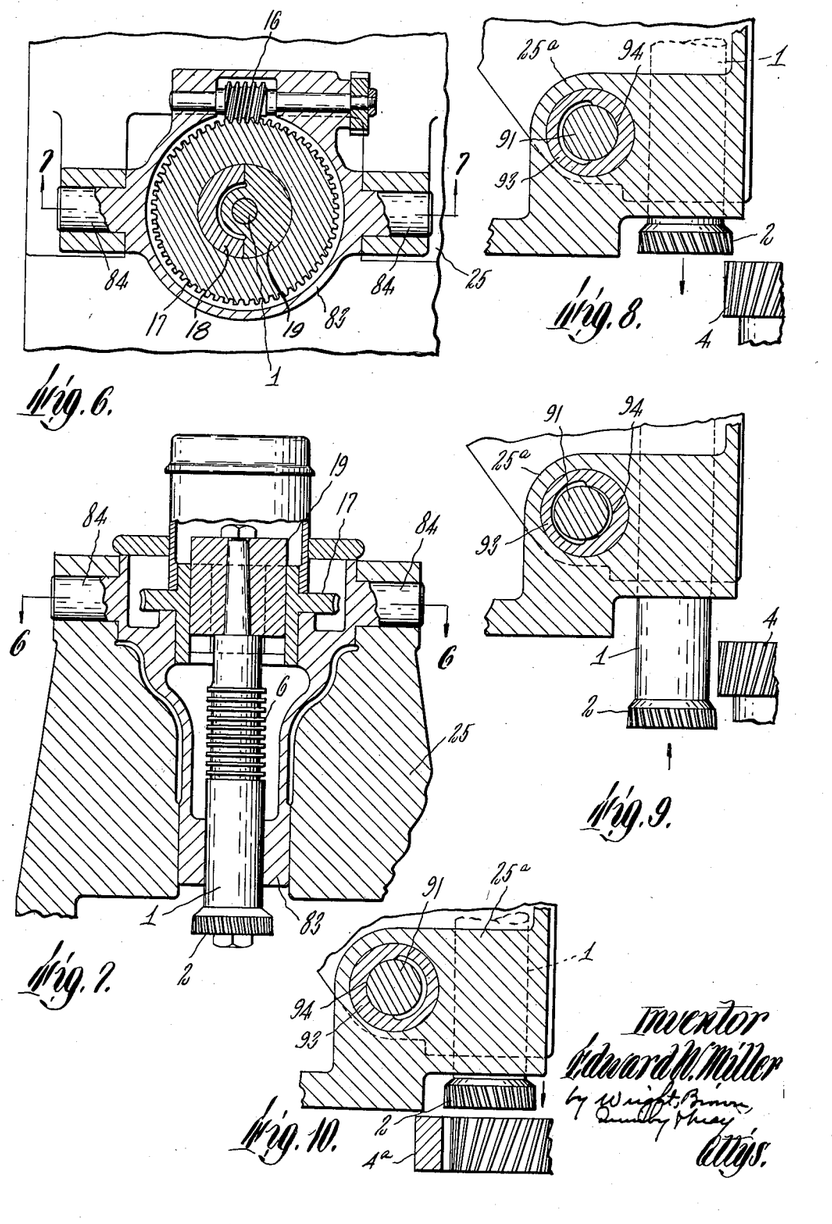
Fig. 6 is a horizontal detail section taken on line 6—6 of Figs. 1 and 7.
Fig. 7 is a vertical section taken on line 7—7 of Figs. 1 and 6.
Fig. 8 is a detail vertical section taken on line 8—8 of Fig. 2, showing the cutter at the commencement of its working stroke.
Fig. 9 is a view similar to Fig. 8, but showing the cutter at the commencement of its return stroke.
Fig. 10 is a view similar to Fig. 8 showing the cutter adjusted for generating an internal gear, whereas the preceding figures show it in condition for generating external gears.

*Setting of cutter for internal work.*—The preceding description assumes that the work piece 4 is an external gear and that the cutter is set to act on its outside circumference. For organizing the cutter to act on internal work, the bell crank lever 54, 56 is equipped with a third arm 125 which is normally clear of the depth feed cam, but which may be brought into engagement therewith, and the arm 56 at the same time shifted clear of the cam, by applying fluid pressure through a pipe 126 to the pressure cylinder 68 at the left hand side of the piston 67 (with respect to Fig. 1), and releasing the pressure at the right hand side of the piston. As the arm 125 is at the opposite side of the line of centers 55—58 from arm 56, it is caused by the depth feed cam to move the cutter oppositely to the movements imparted through arm 56. Before commencement of cutting the cutter is shifted by screw 31 until its rear side or limb (the side opposite to that shown next to the work in Figs. 1, 8 and 9) is so placed as to cut the inner circumference of an internal gear 4a, as shown in Fig. 10. Thus the reversed direction of depth feed causes the operative part of the cutter to be fed outwardly with respect to the center of the work piece.

The seats 94 for the stop bar 91 are also reversed so that the cutter saddle will be brought to a rigid stop when swung away from the axis of the work. The reversed position of one of the seats is shown in Fig. 10. Such reversal may be effected by the means shown in Fig. 2, consisting of gear elements 128 on the sleeves or bushings 93, with which mesh manually rotatable pinions 129.

In order that the strokes of the spindle occurring while the saddle is arrested by the reversed seat 94 may be cutting strokes, either the cutter may be reversed in position on the spindle so as to cut on the up stroke, or the crank pin 14 may be shifted to the opposite side of shaft 13 from the position shown in Fig. 1, or the cam 85 may be turned 180°, thus reversing the timing between the reciprocation of the spindle and its movement away from the work spindle axis.

The provisions just described for adjusting the machine to cut internal gears have the advantage over the usual practice with gear shaping machines (in which the same side of the cutter which acts on an external gear blank is brought to cut an internal gear at the opposite side of the work spindle axis) in that less overhang of the cutter spindle from its support is required. In the case of a large internal gear cut by a relatively small cutter, the reduction of overhang thus obtained is substantial and important. The details of means for securing an internal gear to the work spindle 3 are not here shown, as they involve nothing original with this invention and may be of the same character as those heretofore long used in this art.

Although I have described the operation of the machine as being manually controlled with respect to starting and stopping the main motor 10 and reversing the shift motor 35, it is within my contemplation to provide suitable means for causing these acts to be performed automatically so that the rotation of the depth feed cam will commence at a definite time point in the course of the preliminary approach of the cutter, and the cutter will withdraw automatically when the work is finished, etc.

The electrical elements shown here are purely diagrammatic and typify, rather than depict specifically, the nature of the parts which may be used. Any standard equipment, or devices not now standard but which may later be made available for the uses of industry, which will serve the purposes herein described may be used. With reference to the diagram it may be noted that the solid lines represent the electrical connections and conductors and the broken lines represent the outline of the machine base and cutter carrying bed; except that the dotted lines adjacent to the reversing switch 105 show the latter in its position for reversing the direction of running of the shift motor.

With respect to the mechanical parts of the machine it is to be understood that numerous changes in dimensions and proportions of the parts, reversals of positions and motions, adjusting means for the work spindle to accommodate gear blanks of different dimensions or cluster gears, etc., and refinements of design may be provided at the will of the designer, without departure from the essentials of the invention, provided the cooperative law of the machine, as defined in the appended claims, is maintained.

What I claim and desire to secure by Letters Patent is:

1. A gear generating machine comprising a base, a bed movably mounted on said base, a work holder and a cutter spindle, one of which is mounted on the base and the other on the bed, a screw in threaded connection with the bed, a bodily shiftable abutment for said screw, a depth feed cam in movement transmitting connection with said abutment, an electric motor in rotation-transmitting connection with said screw, and controlling means for causing said motor to rotate the screw in alternately opposite directions before commencement, and after completion, respectively, of the gear generating cycle.

2. A gear generating machine comprising a base, a bed movably mounted on said base, spindles for holding respectively a gear shaper cutter and a gear blank, one of which is rotatably mounted on the base, and the other is rotatably mounted on the bed, a depth feed cam for moving said bed so as to effect such a change in the distance existing between the cutter and gear blank as to cause penetration of the cutter teeth to a given depth in such blank, transmission mechanism between said depth feed cam and bed including a screw element in threaded engagement with the bed, and a shiftable abutment for said screw element, structurally independent of both the base and bed, in reacting engagement with the cam, and means for rotating said screw element so as to alter the position of the bed independently of the action of said cam.

3. A gear generating machine as set forth in claim 2, in which the means for rotating the screw element comprises an electric motor and control means for turning said motor in either direction.

4. In a gear generating machine of the character described, a base, a bed translatively mounted on said base, cooperating cutter and work spindles, one of which is rotatably mounted in the bed and the other is rotatably mounted in the base, means for effecting harmonious rotation of said spindles and bodily translation of one of them in the direction of the axis of the cutter spindle for generating teeth in a gear blank mounted on the work spindle, a screw engaged with the bed for shifting the latter so as to increase or decrease the distance between the cutter spindle axis and the tooth bearing part of the gear blank, a depth feed cam in propelling connection with said screw, an electric motor coupled with the screw for rotating it to impart movement to the bed independently of the depth feed cam, a stop for arresting rotation of the screw, and means controlled by the travel of the bed for placing said stop in arresting relationship to the screw when the bed has reached approximately the position for commencement of the gear cutting cycle.

5. A gear generating machine as set forth in claim 4, and in which said stop is organized to permit relative translative movement of the screw under control of the depth feed cam, while in rotation-preventing connection with the screw.

6. In a gear generating machine of the character described, a base, a bed translatively mounted on said base, cooperating cutter and work spindles, one of which is rotatably mounted in the bed and the other is rotatably mounted in the base, means for effecting harmonious rotation of said spindles and bodily translation of one of them in the direction of the axis of the cutter spindle for generating teeth in a gear blank mounted on the work spindle, a screw element in rotatable threaded engagement with the bed, an abutment for the screw, a depth feed cam and transmission means between said cam and abutment for shifting the latter bodily in the axial direction of the screw element, and a driving motor in geared rotation-transmitting connection with the screw element independently of the connection between the said abutment and depth feed cam, operable independently of the gear generating action for effecting a rapid relative approach and recession between the cutter and work spindles.

7. In a machine tool, a base, a bed movably mounted on said base, and means for imparting movement to the bed comprising a rotatable screw element, a cam element in thrust-transmitting connection with the screw element, one of said elements being mounted to exert thrust against the base, and the other to exert thrust against the bed so as to move the latter a distance sufficient for depth feed between the tool and work in consequence of rotation of the cam element, and independent means for rotating the screw so as to shift the bed between a withdrawn position permitting placement and removal of work pieces, and the position for commencement of the depth feed.

8. A gear generating machine comprising the combination with a cutter spindle, a work spindle, a base on which one of said spindles is supported, a bed or carriage in which the other spindle is mounted and which is shiftable on the base for causing relative recession and approach between the cutter spindle and a gear blank mounted on the work spindle, of depth feed means for advancing the carriage to effect intermesh of prescribed depth between the cutter and gear blank, and means for then clamping the bed to prevent lifting thereof under the cutting thrust during the balance of the generating cycle.

9. In a gear generating machine of the character described, a base, a bed translatively mounted on said base, cooperating cutter and work spindles, one of which is rotatably mounted in the bed, and the other is rotatably mounted in the base, means for effecting harmonious rotation of said spindles and bodily translation of one of them in the direction of the axis of the cutter spindle for generating teeth in a gear blank mounted on the work spindle, means for moving the bed to effect a predetermined extent of penetration of the cutter teeth into the gear blank, and means for clamping the bed to the base at the conclusion of such depth feed.

10. In a gear generating machine of the character described, a base, a bed translatively mounted on said base, cooperating cutter and work spindles, one of which is rotatably mounted in the bed, and the other is rotatably mounted in the base, means for effecting harmonious rotation of said spindles and bodily translation of one of them in the direction of the axis of the cutter spindle for generating teeth in a gear blank mounted on the work spindle, a normally inoperative clamp adapted to bind the bed to the base so as to prevent independent movement thereof, a depth feed element for effecting movement of the bed, and means controlled by said depth feed element for causing said clamp to bind the bed when the cutter and gear blank are intermeshed to the prescribed depth, and for releasing said clamp at the conclusion of the cutting cycle.

11. A gear generating machine as set forth in claim 10, in which the bed clamping means includes an electro magnetic actuator, and the control means therefor comprises circuit making and breaking means in circuit with said electro magnetic device and operable by the depth feed element.

12. In a gear generating machine of the character described, having rotatable cutter and work spindles, one of which is reciprocatable in the direction of length of the cutter spindle, a bed supporting one of said spindles, a base supporting the other spindle and on which the bed is movable, means for guiding the bed including a guideway and a gib in overlapping engagement with said guideway, a cam element in association with said gib for shifting it so as to grip the adjacent guideway, yielding means tending to hold said cam element in a position where the gib is free with respect to the guideway, and means controlled by the placement of the bed in cutting position for moving said cam so as to cause gripping of the guideway by the gib.

13. In a gear shaping machine, the combination with cutter and work spindles rotatably mounted to support a cutter and gear blank respectively in intermeshing cutting relationship, of means for reciprocating one of said spindles endwise, a saddle in which said reciprocatable spindle is journaled, means for swinging said saddle about an axis transverse to the spindle axis for clearance between the cutter and work during non cutting strokes, a stop element carried by the saddle, and an abutment adjacent to said stop element and being reversibly mounted independently of the saddle with provision for placement at either side of the stop element for arresting the saddle in cutting position for either external or internal work.

14. In a gear shaping machine, the combination with cutter and work spindles rotatably mounted to support a cutter and gear blank respectively in intermeshing cutting relationship, of means for reciprocating one of said spindles endwise, a saddle in which said reciprocatable spindle is journaled, means for swinging said saddle about an axis transverse to the spindle axis for clearance between the cutter and work during non cutting strokes, a stop bar carried by the saddle and projecting laterally therefrom, and a normally stationary sleeve mounted on the machine beside the saddle into which said stop bar projects, the sleeve having an abutment portion for engagement by the stop bar when the saddle is brought into the position for cutting.

15. In a gear shaping machine, the combination with cutter and work spindles rotatably mounted to support a cutter and gear blank respectively in intermeshing cutting relationship, of means for reciprocating one of said spindles endwise, a saddle in which said reciprocatable spindle is journaled, means for swinging said saddle about an axis transverse to the spindle axis for clearance between the cutter and work during non cutting strokes, a stop bar protruding from the side of the saddle substantially parallel to the axis thereof, a sleeve rotatably mounted in the adjacent structure of the machine into which the stop bar projects, the interior of the sleeve being wider than the stop bar and having an internal abutment for engagement therewith when the saddle is brought into cutting position, the sleeve being rotatable to bring the abutment to the opposite side of the stop bar, whereby to adjust the machine for cutting either internal or external gears.

16. A gear shaping machine comprising a work spindle, a rotatable and endwise reciprocative cutter spindle, a saddle in which said cutter spindle is mounted, trunnions supporting said saddle on the machine structure with provisions for oscillative movement in a direction which permits advance and withdrawal of the cutter carrying portion of said spindle toward and away from the work spindle axis, means for oscillating the saddle about the trunnion axis in time with the reciprocations of the cutter spindle so as to clear the cutter from the work on return strokes and bring it up to the work on cutting strokes, a stop pin protruding from the side of the saddle, and a sleeve mounted on the adjacent structure of the machine into which the stop pin protrudes, said sleeve having a bore wider than the stop pin in the direction of swinging movement of the latter and having an internal abutment in position to be engaged by the stop pin when the saddle is advanced into cutting position.

17. A gear shaping machine comprising a work spindle, a rotatable and endwise reciprocative cutter spindle, a saddle in which said cutter spindle is mounted, trunnions supporting said saddle on the machine structure with provisions for oscillative movement in a direction which permits advance and withdrawal of the cutter carrying portion of said spindle toward and away from the work spindle axis, means for oscillating the saddle about the trunnion axis in time with the reciprocations of the cutter spindle so as to clear the cutter from the work on return strokes and bring it up to the work on cutting strokes, comprising a lever, a cam acting on one arm of said lever, a link connecting the other arm of said lever with the saddle, a pivot pin connecting said link to the saddle and protruding at either end from opposite sides of the saddle, and sleeves mounted on adjacent flanking parts of the machine structure receiving the protruding ends of said pin and having internal abutment portions for engagement by the pin when the saddle is brought into cutting position.

18. A gear shaping machine comprising a work spindle, a rotatable and endwise reciprocative cutter spindle, a saddle in which said cutter spindle is mounted, trunnions supporting said saddle on the machine structure with provisions for oscillative movement in a direction which permits advance and withdrawal of the cutter carrying portion of said spindle toward and away from the work spindle axis, means for oscillating the saddle about the trunnion axis in time with the reciprocations of the cutter spindle so as to clear the cutter from the work on return strokes and bring it up to the work on cutting strokes, comprising a lever, a cam acting on one arm of said lever, a link connecting the other arm of said lever with the saddle, a pivot pin connecting said link to the saddle and protruding at either end from opposite sides of the saddle, and sleeves mounted on adjacent flanking parts of the machine structure receiving the protruding ends of said pin and having internal abutment portions for engagement by the pin when the saddle is brought into cutting position, said sleeves being rotatable to bring their abutment portions at the opposite side of the pin, whereby to adapt the machine for cutting either external or internal gears.

19. A gear shaping machine having cutter and work spindles rotatably mounted and one of them being adapted to reciprocate, a saddle in which said reciprocative spindle is mounted, a bed to which the saddle is pivoted to swing about an axis transverse to the direction of reciprocation, means for swinging the saddle about said axis, complemental abutments on the saddle and bed for arresting the saddle in cutting position, a depth feed cam for moving the bed in one direction, and means for reversing the relative disposition of said abutments and of the direction in which the depth feed cam moves the bed, whereby to convert the machine from condition for cutting external gears to condition for cutting internal gears, and vice versa.

20. In a gear shaping machine having a work spindle and a cutter spindle, a base in which one of said spindles is mounted, a saddle in which the other spindle is mounted, and a bed carrying said saddle, a depth feed cam, a pivoted cam follower having two arms either of which is engageable exclusively with said cam, said arms being so arranged that when one of them is engaged with the cam the follower is turned in one direction about its axis and when the other arm is engaged with the same part of the cam the follower is turned in a relatively opposite direction without reversal of direction of the rotation of the cam, motion transmission connection between said cam and the saddle carrying bed, and reversible yielding pressure applying means adapted to exert pressure in either of opposite directions upon the bed and thereby to cause either one or the other of said arms to be engaged and moved by the cam.

21. In a gear generating machine having cutter and work spindles, means for relatively moving said spindles so as to cause generation of teeth in a gear blank on the work spindle by a cutter on the cutter spindle, depth feeding means for effecting a progressive advance between the spindles, means for imparting a vibratory back and forth movement to one of said spindles in time with the relative cutting traverses between the spindles in such manner as to clear the cutter from the work on non cutting strokes, stop means for limiting such vibratory movement in one direction, and means for reversing both the direction of depth feed and the limiting position of said stop means, whereby to adapt the machine for cutting either external or internal gears.

22. In a gear generating machine, a base, a slide movable in a fixed path on said base, a bed mounted on said slide and having provisions for relative movement thereon in a direction transverse to the path of movement of the slide, a saddle pivoted to the bed to swing about an axis substantially parallel to one of the before named paths of movement, a spindle rotatably mounted in said saddle on an axis transverse to both of said paths and to the axis of swinging movement, and means for reciprocating said spindle.

23. In a gear generating machine having a reciprocatable and rotatable spindle, a saddle in which said spindle is mounted, a bed supporting said saddle and with respect to which the saddle is movable back and forth transversely to the reciprocating path of the spindle, a slide on which the bed is supported and with respect to which it is movable in a path transverse both to the reciprocating path of the spindle and to the direction of movements of the saddle, a base on which the slide is mounted with provisions for movement in a path transverse to the path of the bed and to the reciprocating path of the spindle, and a holder mounted on the base in the path of movement of said slide.

24. A gear shaping machine as set forth in claim 23, combined with mechanism for simultaneously moving the slide and bed in their respective paths.

25. In a gear shaping machine, the combination of rotatable cutter and work spindles, one of which is reciprocative for effecting relative planing cuts between a cutter mounted on the cutter spindle and a gear blank mounted on the work spindle, means for feeding one of the spindles toward the other to effect a prescribed depth of penetration of the cutter teeth into the work, means for vibrating one of said spindles in time with the cutting reciprocations to clear the cutter from the work on non cutting strokes, and means for adjusting said vibratory spindle transversely of its path of vibratory movement, whereby to place such path at an inclination to the line of centers of the spindles.

26. In a gear generating machine, parallel rotatable cutter and work spindles, one of which is reciprocatable in the axial direction, a saddle in which one of said spindles is mounted, which saddle is pivoted to swing about an axis transverse both to the axes of the spindles and to their line of centers, and means for adjusting the saddle in the direction of its pivot axis whereby to cause the line of centers between the spindles to make a prescribed angle to the plane of oscillation of the saddle.

27. In a gear shaping machine of the type having a gear shaped cutter combined with cutter and work spindles, means for reciprocating one of the spindles in the direction of the axis of the cutter spindle and means for rotating both spindles harmoniously for generation of a gear by such a cutter mounted on the cutter spindle; a supporting structure by which one of said spindles is supported, a bed carrying one of said spindles and being movably mounted on said supporting structure to lengthen and shorten the distance between the spindles, power mechanism for effecting back and forth movements of the bed between approximately the position for commencement of cutting action and a withdrawn position permitting application and removal of work pieces to and from the work spindle, means for limiting the power-driven approach of the bed toward cutting position, and other power mechanism for effecting a gradual depth feeding movement of the bed, additional to the movement given by the before-named mechanism in the course of the cutting cycle.

28. In a gear shaping machine of the type having a gear shaped cutter combined with cutter and work spindles, means for reciprocating one of the spindles in the direction of the axis of the cutter spindle and means for rotating both spindles harmoniously for generation of a gear by such a cutter mounted on the cutter spindle; a supporting base, a bed carrying one of said spindles and being movable to effect movements of approach and recession between the spindles, a screw in threaded engagement with the bed, a screw abutment independent of the bed and movable relatively thereto and to the base, a motor mounted on the base and geared to the screw for rotating the latter to bring the bed from a withdrawn position into approximately the position for commencement of cutting operation, a depth feed cam mounted on the base, power means for rotating said cam, and transmission means between said cam and screw abutment for moving the latter, the screw and the bed in unison; said cam being constructed to effect a progressive movement of the bed from the position to which the bed is brought by the screw.

29. In a gear shaping machine of the type having a gear shaped cutter combined with cutter and work spindles, means for reciprocating one of the spindles in the direction of the axis of the cutter spindle and means for rotating both spindles harmoniously for generation of a gear by such a cutter mounted on the cutter spindle; a supporting base, a bed carrying one of said spindles and being movable to effect movements of approach and recession between the spindles, a nut adjustably mounted in the bed, a screw in threaded engagement with said nut and adapted, when rotated and moved endwise, to shift the bed in the manner set forth, a screw abutment independent of the bed and movable relatively to the base, a depth feed cam organized to take the reaction of said abutment and to impart movement thereto, a motor in geared connection with the screw for rotating it, stop means between the screw and base for arresting rotation of the screw, and means for rotating said nut to effect an adjustment of the bed relatively to the screw.

30. In a gear shaping machine of the type having a gear shaped cutter combined with cutter and work spindles, means for reciprocating one of the spindles in the direction of the axis of the cutter spindle and means for rotating both spindles harmoniously for generation of a gear by such a cutter mounted on the cutter spindle; a supporting structure, a bed carrying one of said spindles and being movable to effect movements of approach and recession between the spindles, a screw in rotatable threaded connection with the base for moving the latter in a prescribed manner, an abutment for the screw independent of the bed and movable relatively to the base, a depth feed cam organized to take the reaction of said abutment and impart movement thereto, an electric torque motor mounted on the base and geared to the screw for rotating the latter, and cooperating stop means on the screw and base for arresting rotation of the screw, said stop means being constructed to permit movement of the screw abutment and screw under the influence of the depth feed cam while the screw is so arrested.

31. In a gear shaping machine, the combination with a base, a bed movable on said base, and cutter and work spindles, one of which is mounted on the bed and the other on the base, of a depth feed cam, a follower lever adjacent to the cam, having two receiving arms alternatively engageable with the cam at relatively opposite sides of the lever fulcrum, transmission means between said lever and bed for transmitting the force application of the cam to the bed, yieldable force-applying means acting on the bed in opposition to the force application of the cam, and means for reversing the force application of said yielding force-applying means and shifting the lever to change its engagement with the cam from one arm to the other.

32. In a gear shaping machine, the combination with a base, a bed movable on said base, and cutter and work spindles, one of which is mounted on the bed and the other on the base, of a cam for exerting thrust and reaction between the bed and base for imparting such movement to the bed as effects a progressive relative feeding movement between the cutter and work spindles whereby to cause cutting into the work to a prescribed depth, and thrust transmitting means between the cam and the bed including a shiftable member between the cam and the bed, organized to occupy either of two different positions in which, respectively, it causes motion of the cam in one direction to impart movement in respectively opposite directions to the bed.

33. A gear generating machine comprising the combination with a base, a bed movable on the base, holders for a cutter and a work piece respectively, one of which is supported by the base and the other is carried by the bed, and means for effecting relative cutting and generating movements between said holders; of power means for imparting back and forth movements to the bed so as, respectively, to separate the cutter and work holders one from the other to permit changing of the work, and bring them into relative position for starting a cutting cycle, automatic means for stopping the action of said mechanism at the end of a prescribed advancing travel of the bed, and a depth feed means for further advancing the bed sufficiently to cause cutting in the work to a prescribed depth.

34. A gear generating machine comprising a base, a bed movably mounted on the base, a work holder and a cutter spindle, one of which is mounted on the base and the other on the bed, a screw in threaded connection with the bed, an abutment for said screw mounted with provision for displacement bodily, independently of both the base and the bed, in the direction of the length of said screw, a depth feed cam in connection with said abutment constructed to effect thereby a progressive relative approach between the cutter spindle and a work piece on the work holder through a distance prescribed as the depth of cutting to be performed in the work piece, and an electric motor connected to rotate said screw for moving the bed additionally to the movements imparted by the depth feed cam.

35. A gear generating machine comprising a base, a bed movably mounted on the base, a work holder and a cutter spindle, one of which is mounted on the base and the other on the bed, a screw in threaded connection with the bed, such threaded connection being adjustable to shift the bed lengthwise relatively to the screw, an abutment for said screw mounted with provision for displacement bodily, independently of both the base and the bed, in the direction of the length of said screw, a depth feed cam in connection with said abutment constructed to effect thereby a progressive relative approach between the cutter spindle and a work piece on the work holder through a distance prescribed as the depth of cutting to be performed in the work piece, an electric motor connected to rotate said screw for moving the bed additionally to the movements imparted by the depth feed cam, an arresting abutment carried revolubly by the screw, and a stop placeable into and out of the path of said arresting abutment for stopping the screw-impelled movement of the bed.

36. In a gear shaping machine, a base, a bed movable back and forth on said base in a prescribed path, a cutter spindle, a work spindle, one of said spindles being mounted on the bed and the other on the base in locations such that movements of the bed in its prescribed path alter the cutting depth of a cutter on said cutter spindle with respect to a work piece on said work spindle, a depth feed cam, means for driving said cam and means for transmitting motion from the cam to the bed including a cam follower shiftable to reverse the direction of such motion.

37. In a gear shaping machine, a base, a bed movable back and forth on said base in a prescribed path, a cutter spindle, a work spindle, one of said spindles being mounted on the bed and the other on the base in locations such that movements of the bed in its prescribed path alter the cutting depth of a cutter on said cutter spindle with respect to a work piece on said work spindle, a depth feed cam, means for driving said cam and means for transmitting motion from the cam to the bed including a pivoted lever having cam-follower arms at respectively opposite sides of the line of centers of the cam and lever, said lever being shiftable about its pivot to bring either follower arm exclusively into force-receiving engagement with the cam.

38. In a gear shaping machine, a base, a bed movable back and forth on said base in a prescribed path, a cutter spindle, a work spindle, one of said spindles being mounted on the bed and the other on the base in locations such that movements of the bed in its prescribed path alter the cutting depth of a cutter on said cutter spindle with respect to a work piece on said work spindle, a depth feed cam, means for driving said cam and means for transmitting motion from the cam to the bed including a pivoted lever having cam-follower arms at respectively opposite sides of the line of centers of the cam and lever, said lever being shiftable about its pivot to bring either follower arm exclusively into force-receiving engagement with the cam combined with yieldable force-applying means reacting between the base and bed and being reversible to cause its force application on the bed to be exerted in one direction or the opposite direction in the path of movement of the bed, whereby one or the other of said follower arms is brought into engagement with the cam, and the latter is enabled by rotation in one and the same direction to cause feeding movement of the bed in opposite directions.

39. In a gear shaping machine having a base, a bed movable on said base, and cutter and work spindles, one of which is mounted on the bed and the other on the base, a depth feed cam mounted on the base, transmission means between said cam and bed for imparting motion to the bed, and a reversing element in said transmission means shiftable to cause such motion to be imparted in one direction or the opposite direction.

EDWARD W. MILLER.